United States Patent
Kito et al.

(10) Patent No.: US 11,413,942 B2
(45) Date of Patent: Aug. 16, 2022

(54) TRIM BOARD FOR VEHICLE DOOR, AND DOOR TRIM

(71) Applicant: TOYOTA BOSHOKU KABUSHIKI KAISHA, Aichi (JP)

(72) Inventors: Masayuki Kito, Aichi-ken (JP); Kosuke Geho, Aichi-ken (JP); Goro Takahashi, Aichi-ken (JP); Mitsutaka Sako, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/616,792

(22) PCT Filed: May 24, 2018

(86) PCT No.: PCT/JP2018/020069
§ 371 (c)(1),
(2) Date: Nov. 25, 2019

(87) PCT Pub. No.: WO2018/221388
PCT Pub. Date: Dec. 6, 2018

(65) Prior Publication Data
US 2020/0079189 A1    Mar. 12, 2020

(30) Foreign Application Priority Data

Jun. 2, 2017 (JP) .............................. JP2017-110427

(51) Int. Cl.
*B60R 13/02* (2006.01)
*B60J 5/04* (2006.01)
(Continued)

(52) U.S. Cl.
CPC ................. *B60J 5/042* (2013.01); *B32B 5/18* (2013.01); *B32B 27/34* (2013.01); *B60J 5/0481* (2013.01);
(Continued)

(58) Field of Classification Search
CPC ............ B60R 13/0237; B60R 13/0243; B60R 2013/0281; B60R 13/02;
(Continued)

(56) References Cited

U.S. PATENT DOCUMENTS 3,873,656 A * 3/1975 Garner ................ B29C 44/0461
264/DIG. 83
4,766,025 A * 8/1988 Sanok ................. B60R 21/0428
264/DIG. 83
(Continued)

FOREIGN PATENT DOCUMENTS

DE 102004025570 A1 * 12/2005 ............. B29C 44/06
DE 102010061556 A1 * 6/2012 ............. B29C 45/16
(Continued)

OTHER PUBLICATIONS

Machine translation of JP 2003/231445 A, obtained from EspaceNet (Year: 2021).*
(Continued)

*Primary Examiner* — Z. Jim Yang
(74) *Attorney, Agent, or Firm* — Greenblum & Bernstein, P.L.C.

(57) ABSTRACT

Disclosed herein are a vehicle door trim board that is less likely to break due to partial use of an impact resistant resin and a door trim using such a vehicle door trim board. A vehicle door trim board includes a reinforcing part made of an impact resistant resin containing a polyolefin resin, a polyamide resin, and a compatibilizer, wherein the compatibilizer is a modified elastomer having a reactive group that reacts with the polyamide resin. The door trim includes: the vehicle door trim board; and a surface skin layer provided on a design surface side of the vehicle door trim board.

7 Claims, 6 Drawing Sheets

(51) Int. Cl.
  *B32B 27/34* (2006.01)
  *B32B 5/18* (2006.01)
  *B29K 23/00* (2006.01)
  *B29K 77/00* (2006.01)
  *B32B 27/32* (2006.01)
  *B29L 31/30* (2006.01)

(52) U.S. Cl.
  CPC .......... *B60R 13/02* (2013.01); *B29K 2023/12* (2013.01); *B29K 2077/00* (2013.01); *B29L 2031/3014* (2013.01); *B32B 27/32* (2013.01); *B32B 2266/0257* (2013.01); *B32B 2266/0271* (2013.01); *B60R 13/0243* (2013.01)

(58) Field of Classification Search
  CPC ... B29C 45/16–1684; B29C 2045/1601–1698; B29L 2031/3005; B29L 2031/3011; B29L 2031/3014; B29L 2031/3017; B29L 2031/302; B29L 2031/3026; B29L 2031/3041; B32B 3/266; B32B 3/14; B32B 3/16; B32B 3/18; B32B 3/22; Y10T 428/18–187; Y10T 428/24273–24347
  See application file for complete search history.

(56) References Cited

U.S. PATENT DOCUMENTS

| | | | | |
|---|---|---|---|---|
| 5,224,299 A * | 7/1993 | Abe | ................ | B60J 5/042 49/502 |
| 6,685,863 B1 * | 2/2004 | Yabushita | ............... | B60R 13/02 264/254 |
| 6,821,465 B1 * | 11/2004 | Stein | ................ | B29C 44/0469 264/83 |
| 9,353,251 B2 | 5/2016 | Kito et al. | | |
| 10,099,625 B1 * | 10/2018 | Lu | ................ | B29C 45/0001 |
| 2002/0018876 A1 * | 2/2002 | Matsuki | ................ | B32B 5/18 425/129.1 |
| 2002/0125693 A1 * | 9/2002 | Alsup | ................ | B60R 21/215 280/730.2 |
| 2003/0175467 A1 * | 9/2003 | Campbell | ............. | B29C 66/723 428/61 |
| 2003/0180498 A1 * | 9/2003 | De Winter | .......... | B29C 44/1238 264/259 |
| 2004/0250499 A1 * | 12/2004 | Taemmerich | ........... | B60R 13/02 52/311.1 |
| 2005/0260382 A1 * | 11/2005 | Schoemann | .......... | B29C 45/006 428/131 |
| 2006/0082179 A1 * | 4/2006 | DePue | ................ | B60R 21/04 296/39.1 |
| 2006/0222841 A1 * | 10/2006 | Masumizu | .............. | B60R 13/02 428/319.3 |
| 2007/0065648 A1 * | 3/2007 | Cowelchuk | ......... | B29C 45/1671 428/218 |
| 2007/0207292 A1 * | 9/2007 | Cowelchuk | ......... | B29C 45/1671 428/174 |
| 2008/0006959 A1 * | 1/2008 | Dooley | .............. | B29C 45/1635 264/102 |
| 2008/0073927 A1 * | 3/2008 | Schoemann | ............. | B60N 2/78 296/37.1 |
| 2008/0254261 A1 * | 10/2008 | Tamada | ................ | B60R 13/01 264/261 |
| 2008/0277955 A1 * | 11/2008 | Sato | ................ | B60R 13/0256 296/1.08 |
| 2010/0013124 A1 * | 1/2010 | Kong | ................ | B29C 45/164 264/328.8 |
| 2010/0031604 A1 * | 2/2010 | Nakajima | ................ | E02F 9/00 52/750 |
| 2010/0095634 A1 * | 4/2010 | Uto | ................ | B60J 5/045 52/784.1 |
| 2010/0183841 A1 * | 7/2010 | Mally | ................ | B60R 13/02 428/138 |
| 2011/0068596 A1 * | 3/2011 | Someschan | ............. | B60R 13/02 264/274 |
| 2011/0135862 A1 * | 6/2011 | Sumi | ................ | B29C 51/10 428/137 |
| 2011/0254311 A1 | 10/2011 | Dajek et al. | | |
| 2012/0064320 A1 * | 3/2012 | Deseure | ................ | B29C 44/086 264/271.1 |
| 2012/0231215 A1 | 9/2012 | Hayashi | | |
| 2012/0235436 A1 * | 9/2012 | Sun | ................ | B29C 45/16 264/254 |
| 2013/0101799 A1 * | 4/2013 | Trier | ................ | B29C 45/1418 428/164 |
| 2014/0225298 A1 * | 8/2014 | Hoch | ................ | B60R 13/0256 264/161 |
| 2014/0364569 A1 * | 12/2014 | Kito | ................ | C08L 23/02 525/183 |
| 2015/0086759 A1 * | 3/2015 | Sumi | ................ | B29D 99/0021 156/244.15 |
| 2015/0165750 A1 * | 6/2015 | De Wilde | ........... | B32B 37/1284 156/245 |
| 2015/0314737 A1 * | 11/2015 | Zimmer | ................ | B32B 3/30 29/428 |
| 2016/0053788 A1 * | 2/2016 | Iwano | ................ | B29C 37/0082 403/268 |
| 2016/0279846 A1 * | 9/2016 | Kong | ................ | B29C 44/0407 |
| 2017/0029610 A1 | 2/2017 | Kito et al. | | |
| 2017/0036638 A1 * | 2/2017 | Cowelchuk | ......... | B29C 45/0081 |
| 2017/0157816 A1 * | 6/2017 | Ito | ................ | F21S 41/28 |
| 2017/0182729 A1 * | 6/2017 | Fox | ................ | B29C 45/0005 |
| 2017/0267072 A1 * | 9/2017 | Jin | ................ | B60J 5/0468 |
| 2017/0361782 A1 * | 12/2017 | Musy | ................ | B23K 35/0244 |
| 2018/0093621 A1 * | 4/2018 | Morimoto | ................ | B60J 10/86 |
| 2018/0186962 A1 * | 7/2018 | Shimura | ................ | C08L 23/26 |
| 2018/0297250 A1 * | 10/2018 | Kamiya | ................ | B29C 45/14 |
| 2019/0039279 A1 * | 2/2019 | Sueoka | ................ | B65D 11/28 |
| 2019/0061614 A1 * | 2/2019 | Neuner | ................ | B60R 13/0237 |
| 2019/0168588 A1 * | 6/2019 | Suzuki | ................ | B60J 5/043 |
| 2019/0248061 A1 * | 8/2019 | Funato | ................ | B60R 13/02 |
| 2019/0389102 A1 * | 12/2019 | Heikkila | ........... | B29C 45/14786 |
| 2020/0023560 A1 * | 1/2020 | Ishii | ................ | B32B 3/04 |

FOREIGN PATENT DOCUMENTS

| | | | | |
|---|---|---|---|---|
| DE | 102015005591 A1 * | 11/2016 | ......... | B29C 45/16 |
| JP | 61-009318 | 1/1986 | | |
| JP | 11-147233 | 6/1999 | | |
| JP | 2003231445 A * | 8/2003 | | |
| JP | 2004-168093 | 6/2004 | | |
| JP | 2008-230552 | 10/2008 | | |
| JP | 2012-188008 | 10/2012 | | |
| JP | 2013-147645 | 8/2013 | | |
| JP | 2013-147647 | 8/2013 | | |
| WO | WO-2017141936 A1 * | 8/2017 | ......... | B29C 65/7808 |

OTHER PUBLICATIONS

Search Report and Written Opinion issued in Singapore Application No. 11201909515S, dated Aug. 20, 2020.
Office Action issued in Russia Patent Appl. No. 2019141082, dated May 13, 2020, along with an English translation thereof.
Official Communication issued in International patent application No. PCT/JP2018/020069 dated Jul. 10, 2018, along with English translation.
KR Office Action issued in KR Patent Application No. 10-2019-7032430, dated Feb. 20, 2021, English translation.
IN Office Action issued in IN Patent Application No. 201917042163, dated Dec. 19, 2020, English translation.
EESR issued in EP Patent Application No. 18810395.6, dated Feb. 5, 2021.
Office Action issued in Japanese Patent Application No. 2019-522178, dated Nov. 30, 2021, English translation.
Office Action issued in KR Patent Application No. 10-2019-7032430, dated Aug. 10, 2021, English translation.

* cited by examiner

TRIM BOARD FOR VEHICLE DOOR, AND DOOR TRIM

TECHNICAL FIELD

The present invention relates to a vehicle door trim board and a door trim. More specifically, the present invention relates to a door panel provided on the interior side of a vehicle door panel and a vehicle door trim board constituting the door panel.

BACKGROUND ART

A door trim is provided on the interior side of a vehicle door, and a design surface thereof imparts a design to a vehicle interior. On the other hand, the door trim plays an important role to absorb side impact together with a door panel and protect occupants. Therefore, the door trim is required to highly perform multiple functions different in character in parallel.

The following Patent Literature 1 discloses a technique in which a high-impact resistant core member is used as a vehicle door trim board. Further, the following Patent Literatures 2 and 3 disclose an impact resistant resin containing a polyolefin resin and a polyamide resin.

CITATIONS LIST

Patent Literatures

Patent Literature 1: JP H11-147233 A
Patent Literature 2: JP 2013-147645 A
Patent Literature 3: JP-2013-147647 A

SUMMARY OF INVENTION

Technical Problems

The above-mentioned Patent Literature 1 discloses a technique in which a high-impact resistant core member is used as a vehicle door trim board, and discloses, as a material of the high-impact resistant core member, a polypropylene resin containing a rubber-based component. However, vehicles are recently required to be highly fuel-efficient, and therefore it is difficult to use such an integrally-formed high-impact resistant member as disclosed in Patent Literature 1. On the other hand, lightweight fiber-reinforced boards or foamed resin boards are heavily used these days, and vehicle door trim boards are required to deliver high occupant protection performance while using these boards.

Patent Literature 2 discloses that a modified elastomer can be used as a compatibilizer in a resin composition containing a polyamide resin and a polyolefin resin. Patent Literature 3 discloses that a resin composition containing a polyamide resin and a polyolefin resin can have a phase structure having a continuous phase, a dispersed phase, and a fine dispersed phase.

However, the above-mentioned Patent Literatures 2 and 3 disclose that these resin compositions can be used for door trims, but there is no description about what form the resin compositions should take when they are used for vehicle door trim boards to enjoy the benefits thereof.

In light of the above circumstances, it is an object of the present invention to provide a vehicle door trim board that uses a predetermined impact resistant resin as part thereof and is therefore less likely to break. It is also an object of the present invention to provide a door trim using such a vehicle door trim board.

Solutions to Problems

In order to achieve the above objects, the present invention provides the following.

A vehicle door trim board according to an aspect of this application including a reinforcing part made of an impact resistant resin containing a polyolefin resin, a polyamide resin, and a compatibilizer, wherein
the compatibilizer is a modified elastomer having a reactive group that reacts with the polyamide resin.

A vehicle door trim board according to an aspect of this application, further comprising an upper board part and a lower board part which are separated in a vertical direction,
wherein the reinforcing part is interposed between the upper board part and the lower board part.

A vehicle door trim board according to an aspect of this application, wherein each of the upper board part and the lower board part is formed of a foamed resin board using another thermoplastic resin different from the impact resistant resin, and
the upper board part, the lower board part, and the reinforcing part are integrally provided as a multi-material molded product using the other thermoplastic resin and the impact resistant resin.

A vehicle door trim board according to an aspect of this application, wherein each of the upper board part and the lower board part is formed of a fiber-reinforced board containing plant fibers and a binder resin that binds the plant fibers together, and
the upper board part, the lower board part, and the reinforcing part are integrally provided as an insert-molded product using the fiber-reinforced boards as insert bodies.

A vehicle door trim board according to an aspect of this application, further including an upper board part and a lower board part which are adjacent to each other in a vertical direction, wherein
the reinforcing part is provided so as to cover at least a surface of a boundary zone between the upper board part and the lower board part.

A vehicle door trim board according to an aspect of this application, wherein the upper board part and the lower board part are integrally formed of a foamed resin board using another thermoplastic resin different from the impact resistant resin, and
the upper board part, the lower board part, and the reinforcing part are integrally provided as a multi-material molded product using the other thermoplastic resin and the impact resistant resin.

A vehicle door trim board according to an aspect of this application, wherein the upper board part and the lower board part are integrally formed of a fiber-reinforced board containing plant fibers and a binder resin that binds the plant fibers together, and
the upper board part, the lower board part, and the reinforcing part are integrally provided as an insert-molded product using the fiber-reinforced board as an insert body.

A vehicle door trim board according to an aspect of this application, wherein the reinforcing part is provided in a band form so as to penetrate the vehicle door trim board in a front-back direction of a vehicle,
the lower board part has at least one other band-shaped reinforcing part different from the reinforcing part, and the other reinforcing part is made of the impact resistant resin and provided almost in parallel to the reinforcing part.

A vehicle door trim board according to an aspect of this application, wherein the impact resistant resin has a continuous phase (A) containing the polyolefin resin, and a dispersed phase (B) that is dispersed in the continuous phase (A) and contains the polyamide resin and the modified elastomer.

A vehicle door trim board according to an aspect of this application, wherein the dispersed phase (B) has a continuous phase (B1) containing the polyamide resin, and a fine dispersed phase (B2) that is dispersed in the continuous phase (B1) and contains the modified elastomer.

A vehicle door trim board according to an aspect of this application, wherein the modified elastomer is an olefin-based thermoplastic elastomer having, as a skeleton, a copolymer of ethylene or propylene and an α-olefin having 3 to 8 carbon atoms.

A trim board according to an aspect of this application including: the vehicle door trim board according to an aspect of this application; and a surface skin layer provided on a design surface side of the vehicle door trim board.

Advantageous Effects of Invention

According to the present invention, it is possible to provide a vehicle door trim board that is less likely to break and a door trim.

When the present vehicle door trim board includes an upper board part and a lower board part which are separated in a vertical direction and a reinforcing part interposed between them, it is possible to prevent the breakage of the vehicle door trim board caused by the difference in rigidity between the upper board part and the lower board part. The upper board part and the lower board part of the vehicle door trim board are different in rigidity, and therefore it is conceivable that the vehicle door trim board will break due to the difference in rigidity when subjected to an impact load. However, since the vehicle door trim board includes the reinforcing part that is made of an impact resistant resin and interposed between the upper board part and the lower board part, the difference in rigidity between the upper board part and the lower board part is reduced so that the above-described breakage can be prevented.

Further, when each of the upper board part and the lower board part is formed of a foamed resin board, the upper board part, the lower board part, and the reinforcing part can integrally be provided as a multi-material molded product by forming the foamed resin boards using another thermoplastic resin and forming the reinforcing part using an impact resistance resin. This makes it possible to provide a vehicle door trim board that has excellent impact resistance and is therefore less likely to break.

Further, when each of the upper board part and the lower board part is formed of a fiber-reinforced board, the upper board part, the lower board part, and the reinforcing part can integrally be provided as an insert-molded product by forming the reinforcing part by injection molding using the fiber-reinforced boards as insert bodies. This makes it possible to provide a vehicle door trim board that has excellent impact resistance and is therefore less likely to break.

When the present vehicle door trim board includes an upper board part and a lower board part which are adjacent to each other in a vertical direction and a reinforcing part that covers a surface of a boundary zone between the upper board part and the lower board part, it is possible to prevent breakage caused by the difference in rigidity between the upper board part and the lower board part. The upper board part and the lower board part of the vehicle door trim board are different in rigidity, and therefore it is conceivable that the vehicle door trim board will break due to the difference in rigidity when subjected to an impact load. However, since the vehicle door trim board includes the reinforcing part that is made of an impact resistant resin and interposed between the upper board part and the lower board part, the difference in rigidity between the upper board part and the lower board part is reduced so that the above-described breakage can be prevented.

Further, when the upper board part and the lower board part are integrally formed of a foamed resin board, the upper board part, the lower board part, and the reinforcing part can integrally be provided as a multi-material molded product by forming the foamed resin board using another thermoplastic resin and forming the reinforcing part using an impact resistance resin. This makes it possible to provide a vehicle door trim board that has excellent impact resistance and is therefore less likely to break.

Further, when the upper board part and the lower board part are integrally formed of a fiber-reinforced board, the upper board part, the lower board part, and the reinforcing part can integrally be provided as an insert-molded product by forming the reinforcing part by injection molding using the fiber-reinforced board as an insert body. This makes it possible to provide a vehicle door trim board that has excellent impact resistance and is therefore less likely to break.

When in the present vehicle door trim board, the reinforcing part is provided in the form of a band so as to penetrate the vehicle door trim board in the front-back direction of a vehicle, the lower board part has at least one other band-shaped reinforcing part made of the impact resistant resin, and the other reinforcing part is provided almost in parallel to the reinforcing part, crumple zones necessary for occupant protection (e.g., a chest protection zone, an abdomen protection zone, a lumbar protection zone) can be formed using the reinforcing part and the other reinforcing part.

BRIEF DESCRIPTION OF DRAWINGS

The present invention is further described in the following detailed description with reference to non-limiting examples of exemplary embodiments of the present invention and the noted drawings, in which the same reference numerals represent the same parts throughout several views of the drawings. It is to be noted that sectional views in FIGS. 2 and 4 to 7 each are taken along A-A' lines in perspective views.

DESCRIPTION OF EMBODIMENTS

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, and the description taken with the drawings makes apparent to those skilled in the art how the several forms of the present invention may be embodied in practice.

[1] Vehicle Door Trim Board

A vehicle door trim board (20) according to the present invention includes a reinforcing part (23) made of an impact resistant resin containing a polyolefin resin, a polyamide resin, and a compatibilizer, wherein the compatibilizer is a modified elastomer having a reactive group that reacts with the polyamide resin.

Figure 12:
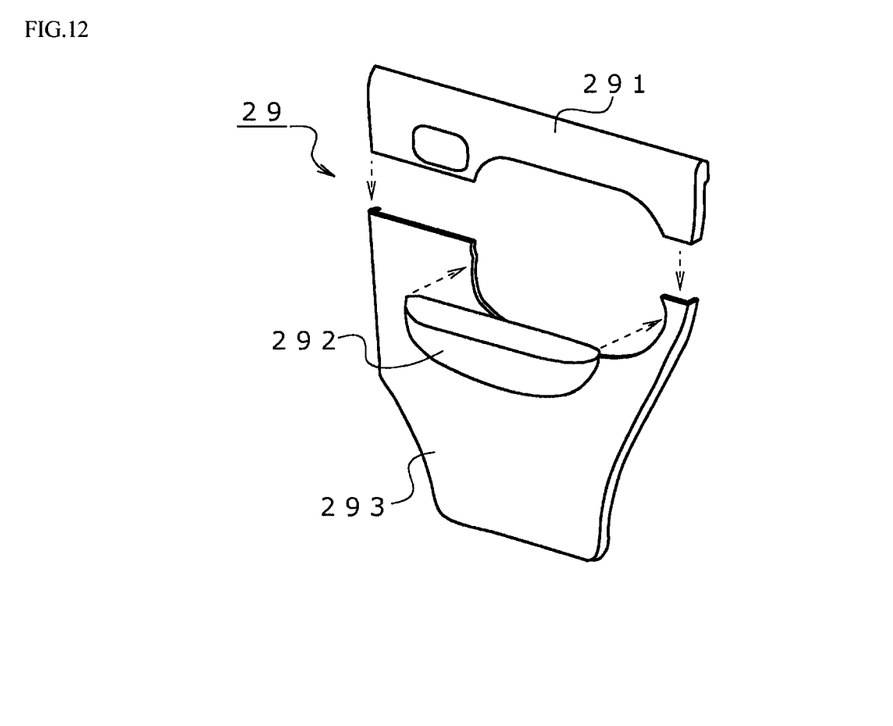
FIG. 12 is a perspective view that illustrates a conventional vehicle door trim board.

As shown in FIG. 12, a conventional vehicle door trim board 29 includes parts separated from each other. More specifically, the conventional vehicle door trim board 29 is constituted from, for example, three parts: an upper board 291, an armrest board 292, and a lower board 293. The upper board 291 and the lower board 293 are different in rigidity because of, for example, their difference in shape and size, and therefore there is a fear of breakage at the boundary between the upper board 291 and the lower board 293. Therefore, the armrest board 292 is generally subjected to weakening at a position where the armrest board 292 is engaged with the upper board 291 and the lower board 293. For these reasons, the number of component parts tends to increase, and a mechanism for weakening is required.

On the other hand, the vehicle door trim board 20 according to the present invention includes the reinforcing part 23, and therefore can integrally be formed as illustrated in FIGS. 2 to 7. By integrally forming the vehicle door trim board 20 according to the present invention, the properties of the impact resistant resin constituting the reinforcing part 23 can effectively be enjoyed. This makes it possible to provide a vehicle door trim board that is less likely to break.

More specifically, it is possible to provide the following vehicle door trim boards 20 according to first to sixth embodiments.

First Embodiment

Figure 2:
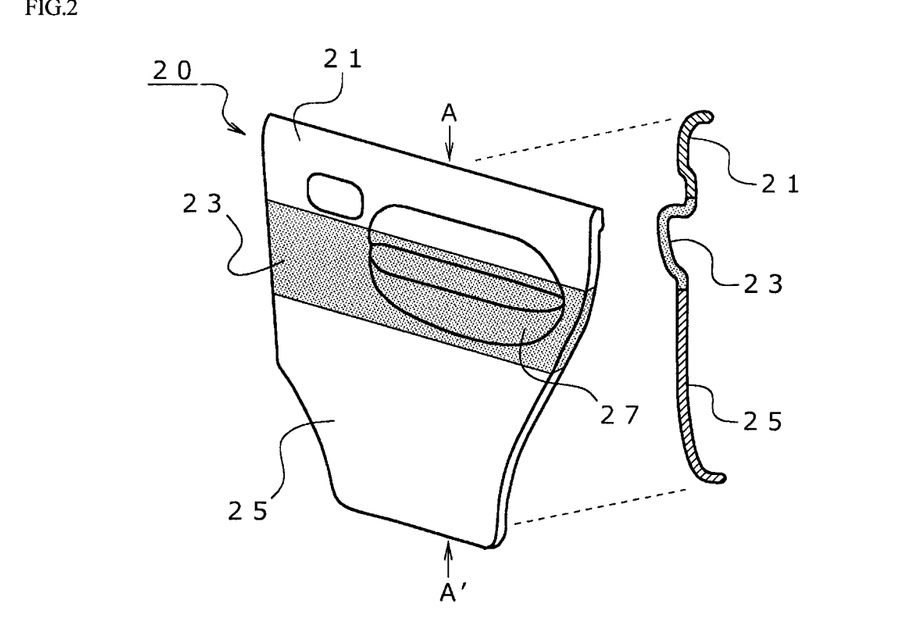
FIG. 2 shows a perspective view and a sectional view which illustrate an example of a vehicle door trim board.

When an upper board part 21 and a lower board part 25 are separated in a vertical direction, that is, when an upper board part 21 and a lower board part 25 are provided as separate boards, the reinforcing part 23 is interposed between the upper board part 21 and the lower board part 25 so that the vehicle door trim board 20 can be provided in which the upper board part 21, the reinforcing part 23, and the lower board part 25 are integrated together (see FIG. 2). In this case, the reinforcing part 23 can be provided so as to cross the vehicle door trim board 20 in the front-back direction of a vehicle. That is, the reinforcing part 23 can be provided in the form of a band in the center of the vehicle door trim board 20 (the reinforcing part 23 penetrates the vehicle door trim board 20 in the front-back direction).

Such a structure makes it possible for the reinforcing part 23 interposed between the upper board part 21 and the lower board part 25 to flexibly absorb impact so as to absorb a difference in rigidity between the upper board part 21 and the lower board part 25. Therefore, the vehicle door trim board 20 can absorb impact without breakage even when the upper board part 21, the reinforcing part 23, and the lower board part 25 are integrated together.

Figure 3:
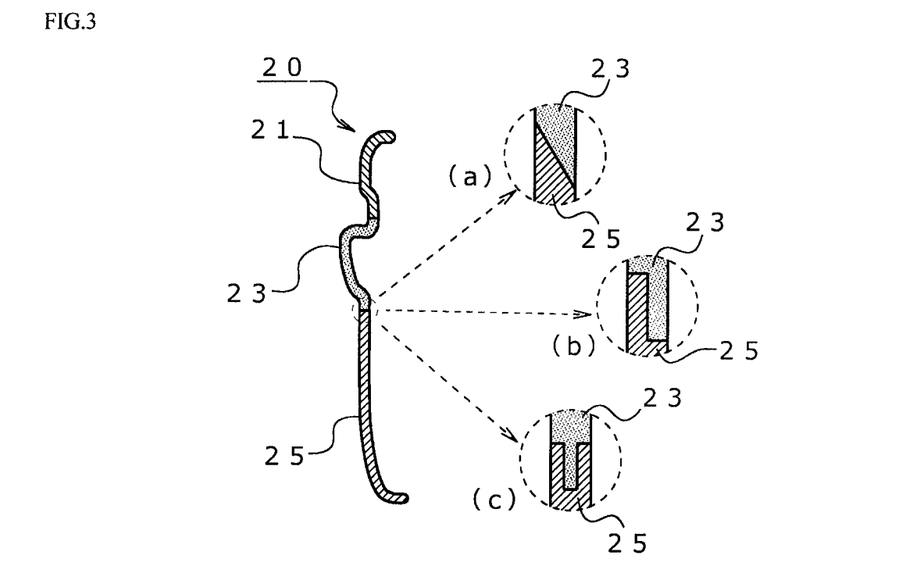
FIG. 3 is a drawing that illustrates connection configurations of a reinforcing part.
Figure 4:
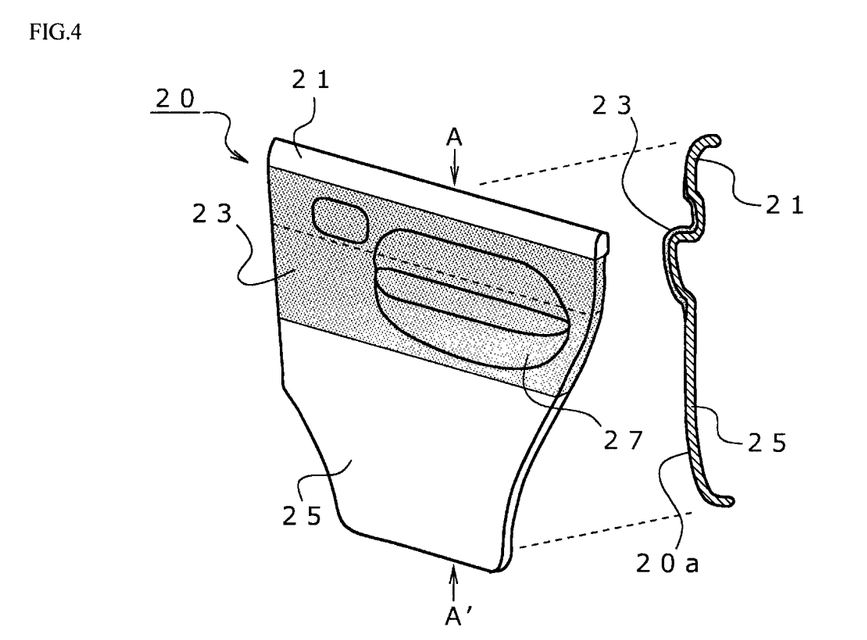
FIG. 4 shows a perspective view and a sectional view which illustrate another example of the vehicle door trim board.

In such a vehicle door trim board 20 integrally formed by interposing the reinforcing part 23 between the upper board part 21 and the lower board part 25, the joining configuration of a joint between the reinforcing part 23 and the upper board part 21 or a joint between the reinforcing part 23 and the lower board part 25 is not particularly limited, and examples thereof include those shown in FIGS. 3(*a*) to 3(*c*). More specifically, in the case of the joining configuration shown in FIG. 3(*a*), the reinforcing part 23 and the other part to be joined therewith are formed in such a manner that their respective joining portions are beveled when viewed in a cross section. In this case, the area of the joint can be increased to increase joint strength. Further, as shown in FIG. 3(*b*), the thicknesses of joining portions of the reinforcing part 23 and the other part to be joined therewith may be reduced and the reinforcing part 23 and the other part may be engaged together in such a manner that the total thickness of joining portions of the reinforcing part 23 and the other part equals to the thickness of the one vehicle door trim board 20. Also in this case, the area of the joint can be increased to increase joint strength. Further, as shown in FIG. 3(*c*), the joining portions of the reinforcing part 23 and the other part to be joined therewith may be shaped in such a manner that one of the joining portions can be fitted in the other joining portion so that the reinforcing part 23 and the other part can be engaged together. Also in this case, the area of the joint can be increased to increase joint strength.

Particularly, when such a joining structure as shown in FIG. 3(*b*) or 3(*c*) is obtained using multi-material molding that will be described later, it is generally necessary to chamfer corners to prevent stress concentration at the corners. However, since the impact resistant resin is used in the present invention, it is possible to eliminate the need for chamfering of the tip corners of a convex portion (which correspond to the tip corners of a tenon in mortise joint) and the bottom corners of a convex portion (which correspond to the bottom corners of a mortise in mortise joint).

Figure 7:
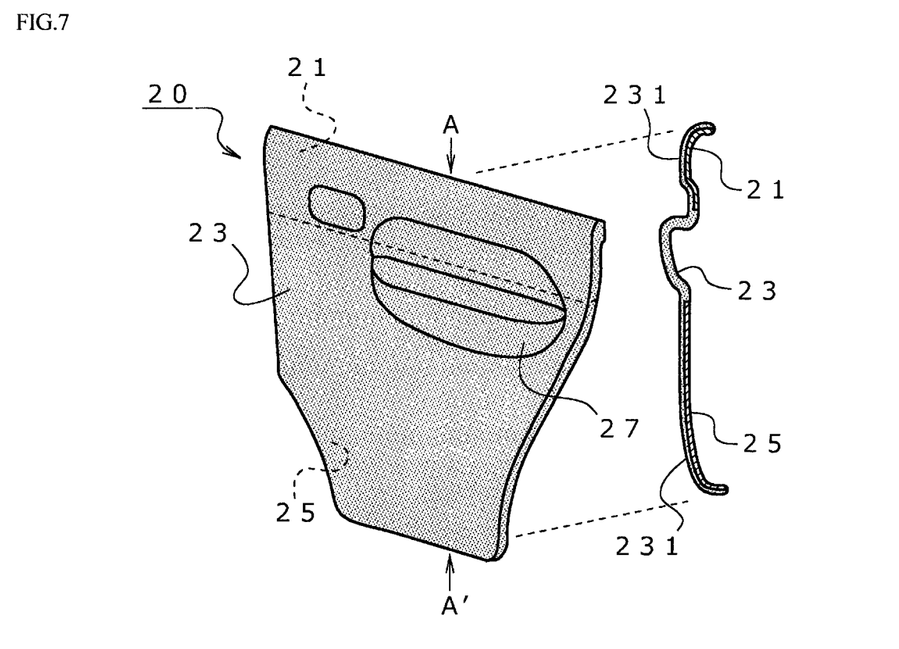
FIG. 7 shows a perspective view and a sectional view which illustrate another example of the vehicle door trim board.

As shown in FIG. 7, the vehicle door trim board 20 may include an extension part 231 that extends from the reinforcing part 23 so as to cover the entire surface of the upper board part 21 and the lower board part 25. In this case, higher joint strength can be achieved.

In the present invention, another reinforcing part 24 may be used in combination with the reinforcing part 23. Particularly, as described above, when the reinforcing part 23 is provided in the form of a band so as to penetrate the vehicle door trim board 20 in the front-back direction of a vehicle (i.e., so as to cross the vehicle door trim board 20), another reinforcing part 24 that is also in the form of a band may be used in combination with the reinforcing part 23. The number of the other reinforcing parts 24 to be provided may be only one or two or more.

Figure 8:
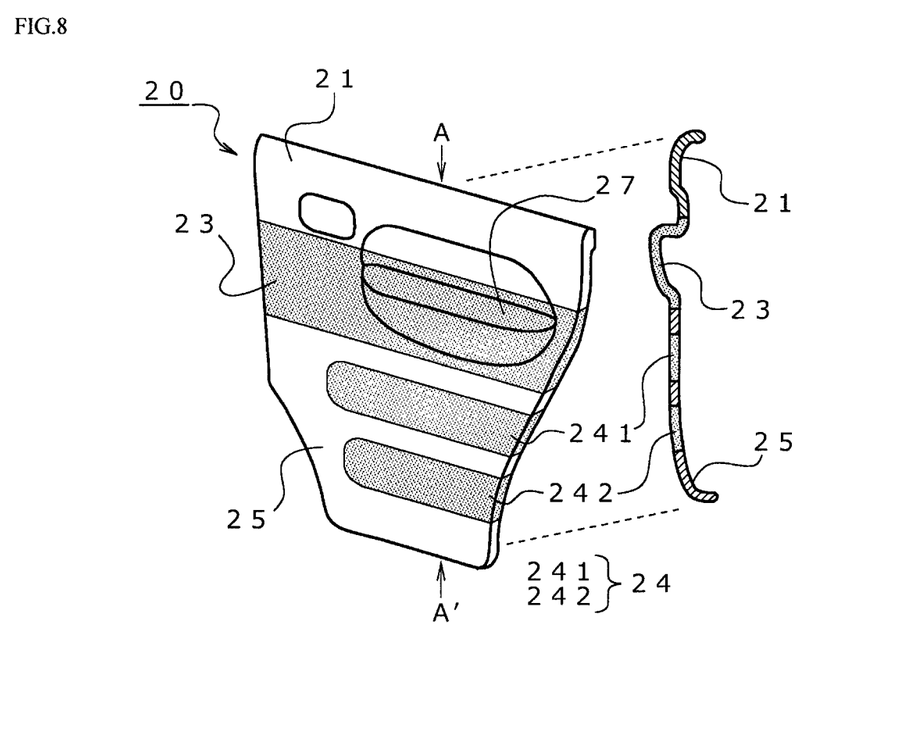
FIG. 8 shows a perspective view and a sectional view which illustrate another example of the vehicle door trim board.
Figure 9:
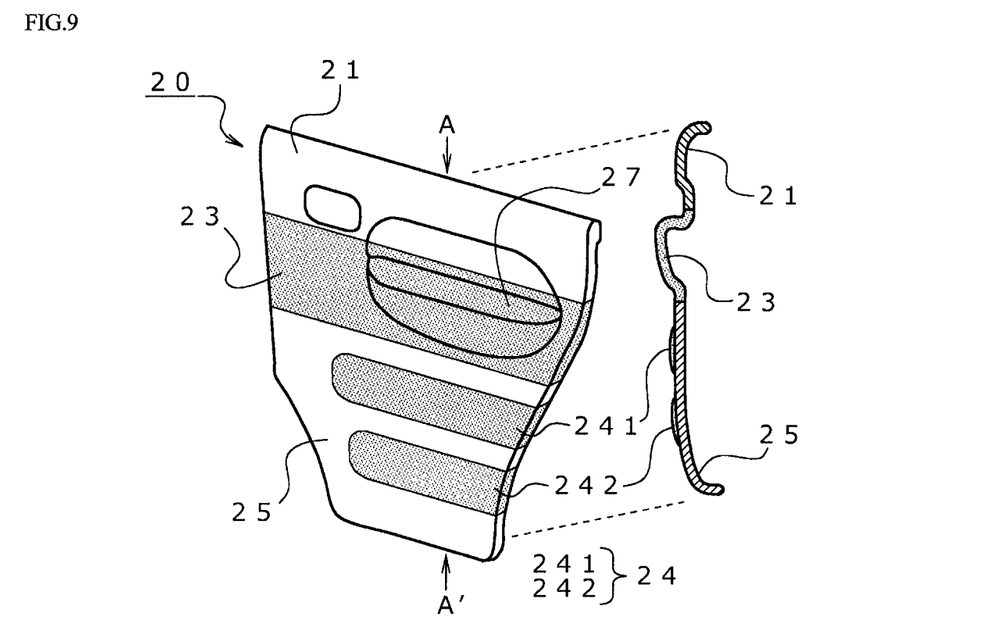
FIG. 9 shows a perspective view and a sectional view which illustrate another example of the vehicle door trim board.

More specifically, as shown in FIGS. 8 and 9, the other reinforcing part 24 may be provided in the lower board part 25. The other reinforcing part 24 may include, for example, two parts: another reinforcing part 241 and another reinforcing part 242. Similarly to the reinforcing part 23, the other reinforcing part 24 can also be formed using the above-described impact resistant resin.

The reinforcing part 23 and the other reinforcing part 24 may be provided so as to be almost parallel to each other. When one band-shaped reinforcing part 23 and two band-shaped other reinforcing parts 24 (other reinforcing parts 241 and 242) are provided so as to be almost parallel to one another, it is preferred that the reinforcing part 23 be disposed so as to correspond to the chests of occupants, the other reinforcing part 241 be disposed so as to correspond to the abdomens of occupants, and the other reinforcing part 242 be disposed so as to correspond to the lumbars of occupants. This makes it possible to allow the reinforcing part and the other reinforcing parts to appropriately function as crumple zones necessary for occupant protection. More specifically, it is possible to allow the reinforcing part 23, the other reinforcing part 241, and the other reinforcing part 242 to function as a chest protection zone, an abdomen protection zone, and a lumbar protection zone, respectively.

The other reinforcing part 24 may be provided so as to be replaced with part of the lower board part 25 as shown in FIG. 8, or may be provided so as to be attached to one (or both) of the front and back surfaces of the lower board part 25 as shown in FIG. 9.

It is to be noted that in FIGS. 2, 3, and 7 to 9, an armrest board part 27 is also integrally formed with the reinforcing part 23, but in some cases, the armrest board part 27 may be made of another material (e.g., a material common to the upper board part 21 and the lower board part 25) and integrated with the reinforcing part 23 during molding.

Second Embodiment

Each of the upper board part 21 and the lower board part 25 may be made of any material. For example, each of the upper board part 21 and the lower board part 25 may be formed as a fiber-reinforced board containing reinforcing fibers and a binder resin that binds the reinforcing fibers together.

In this case, the vehicle door trim board 20 can integrally be formed as an insert-molded product using the fiber-reinforced boards (the upper board part 21 and the lower board part 25) as insert bodies. That is, by injecting the impact resistant resin between fiber-reinforced boards that are the upper board part 21 and the lower board part 25 formed as insert bodies, the vehicle door trim board 20 can be obtained in which the upper board part 21, the lower board part 25, and the reinforcing part 23 are integrated together.

The type of the reinforcing fibers constituting the fiber-reinforced board is not limited, and inorganic fibers (e.g., glass fibers) or organic fibers (natural fibers such as plant fibers or animal fibers) can be used. These reinforcing fibers may be used singly or in combination of two or more of them.

Among them, organic fibers are preferred, natural fibers are more preferred, and plant fibers are particularly preferred. Plant fibers are derived from plants, and include fibers extracted from plants and fibers obtained by processing them. Examples of the plant fibers include vein plant fibers (e.g., abaca, sisal, agave), bast plant fibers (e.g., flax, jute, hemp, kenaf, ramie), wood-based plant fibers (plant fibers extracted from broad-leaf trees, needle-leaf trees, etc.), and other plant fibers (e.g., coconut shell fibers, oil palm empty fruit bunch fibers, rice straw fibers, wheat straw fibers, bamboo fibers, cotton).

The type of the binder resin is not limited, either. The binder resin can be selected depending on the type of reinforcing fibers to be used, but is particularly preferably a thermoplastic resin. Specific examples of the binder resin include a polyolefin resin, a polyester resin, a polystyrene resin, an acrylic resin, a polyamide resin, a polycarbonate resin, a polyacetal resin, and an ABS resin. These resins may be used singly or in combination of two or more of them.

Among them, a polyolefin resin is preferred. Examples of the polyolefin resin include polyethylene resins (the content of an ethylene-derived structural unit is 50% or more of the total structural units) such as an ethylene homopolymer, an ethylene-1-butene copolymer, an ethylene-1-hexene copolymer, and an ethylene-4-methyl-1-pentene copolymer. Other examples of the polyolefin resin include polypropylene resins (the content of a propylene-derived structural unit is 50% or more of the total structural units) such as a propylene homopolymer, a propylene-ethylene copolymer (e.g., a propylene-ethylene random copolymer), and a propylene-1-butene copolymer.

The binder resin may be only an unmodified thermoplastic resin, but may contain a thermoplastic resin modified by introducing a polar group. Examples of the polar group include an anhydrous carboxylic acid group (—CO—O—OC—), a carboxylic acid group (—COOH), a carbonyl group (—CO—), a hydroxyl group (—OH), an amino group (—NH$_2$), a nitro group (—NO$_2$), and a nitrile group (—CN). These polar groups may be used singly or in combination of two or more of them.

The ratio between the reinforcing fibers and the binder resin is not limited. However, when the total amount of them is taken as 100% by mass, the amount of the reinforcing fibers may be 10% by mass or more but 90% by mass or less (or may be 15% by mass or more but 85% by mass or less, 25% by mass or more but 75% by mass or less, or 35% by mass or more but 65% by mass or less).

The reinforcing part 23 of the vehicle door trim board 20 contains a polyolefin resin, and a modified elastomer as a compatibilizer. As the modified elastomer, an olefin-based thermoplastic elastomer can be used which will be described later. Therefore, when a polyolefin resin is used as the above-described binder resin, and a modified polyolefin resin obtained by introducing a polar group is used as part of the polyolefin resin constituting the binder resin, the reinforcing part 23 preferably uses a polyolefin resin and an olefin-based thermoplastic elastomer. By using them in combination, it is possible to provide a vehicle door trim board that is extremely less likely to break.

Third Embodiment

As described above, each of the upper board part 21 and the lower board part 25 may be made of any material. For example, each of the upper board part 21 and the lower board part 25 can be formed as a foamed resin board.

In this case, by performing, in one mold, formation of foamed resin boards (the upper board part 21 and the lower board part 25) using a predetermined resin material and formation of the reinforcing part 23 using the impact resistant resin, the vehicle door trim board 20 can be obtained as a multi-material molded product in which the upper board part 21, the lower board part 25, and the reinforcing part 23 are integrated together.

The resin material constituting the foamed resin boards is not limited, but another thermoplastic resin can be used which is different from the impact resistant resin constituting the reinforcing part 23 (i.e., a multi-material molded product can be obtained). More specifically, the same olefin-based resin as that used as a binder resin in the above-described second embodiment can be used together with a foaming agent. That is, the other thermoplastic resin to be used to form the foamed resin boards may be, for example, a polyolefin resin. In this case, by using the polyolefin resin in combination with a polyolefin resin and an olefin-based thermoplastic elastomer (compatibilizer) which can be used to form the reinforcing part 23, it is possible to provide a vehicle door trim board that is extremely less likely to break.

Fourth Embodiment

When the upper board part 21 and the lower board part 25 are adjacent to each other in a vertical direction, the vehicle door trim board 20 that is less likely to break can be obtained by covering the surfaces of the upper board part 21 and the lower board part 25 with the reinforcing part 23. In this case, the reinforcing part 23 is preferably provided so as to cover at least the surface of a boundary zone between the upper board part 21 and the lower board part 25 (see FIG. 4). As a matter of course, as shown in FIG. 5, the reinforcing part 23 may be provided so as to cover the entire surface of the upper board part 21 and the lower board part 25 including the surface of the boundary zone (see FIG. 5).

Figure 5:
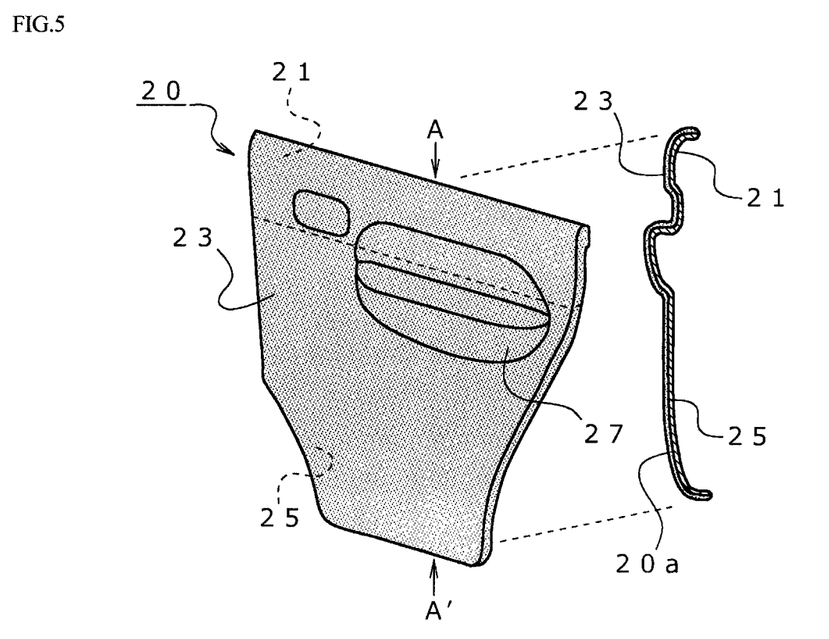
FIG. 5 shows a perspective view and a sectional view which illustrate another example of the vehicle door trim board.
Figure 6:
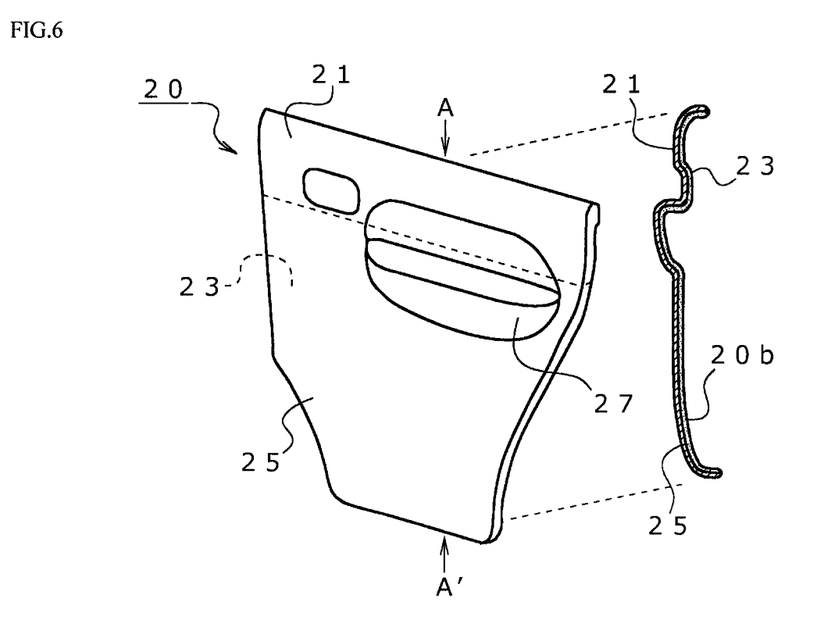
FIG. 6 shows a perspective view and a sectional view which illustrate another example of the vehicle door trim board.

Further, the reinforcing part 23 covering the surface may be provided on the design surface 20a side (vehicle interior side) of the vehicle door trim board 20 as shown in FIG. 5, or may be provided on the non-design surface 20b side (vehicle exterior side) of the vehicle door trim board 20 as shown in FIG. 6. However, the reinforcing part 23 is preferably provided on the design surface 20a side (vehicle interior side) of the vehicle door trim board 20.

As a matter of course, the other reinforcing part 24 described above in the first embodiment with reference to FIGS. 8 and 9 can be provided also when the reinforcing part 23 is provided in such a manner as described above with reference to FIG. 4.

Fifth Embodiment

Each of the upper board part 21 and the lower board part 25 may be made of any material. Similarly to the second embodiment, each of the upper board part 21 and the lower board part 25 may be formed as a fiber-reinforced board containing reinforcing fibers and a binder resin that binds the reinforcing fibers together.

In this case, the vehicle door trim board 20 can integrally be formed as an insert-molded product using the fiber-reinforced boards (the upper board part 21 and the lower board part 25) as insert bodies. That is, by injecting the impact resistant resin onto the surfaces of fiber-reinforced boards that are the upper board part 21 and the lower board part 25 formed as insert bodies (onto at least the surface of a boundary zone between the upper board part 21 and the lower board part 25), the vehicle door trim board 20 can be obtained in which the upper board part 21, the lower board part 25, and the reinforcing part 23 are integrated together.

Also in this case, plant fibers can be used as the reinforcing fibers as in the case of the second embodiment, and a preferred binder resin is also the same as that described with reference to the second embodiment.

Sixth Embodiment

As described above, each of the upper board part 21 and the lower board part 25 may be made of any material. Similarly to the third embodiment, each of the upper board part 21 and the lower board part 25 may be formed as a foamed resin board.

In this case, by performing, in one mold, formation of foamed resin boards (the upper board part 21 and the lower board part 25) using a predetermined resin material and formation of the reinforcing part 23 using the impact resistant resin, the vehicle door trim board 20 can be obtained as a multi-material molded product in which the upper board part 21, the lower board part 25, and the reinforcing part 23 are integrated together. In this case, similarly to the third embodiment, a polyolefin resin and a modified polyolefin resin obtained by introducing a polar group can be used as another thermoplastic resin constituting the foamed resin boards.

Hereinbelow, the above-described impact resistant resin constituting the reinforcing part 23 will be described by focusing on common points (including common points among the first to sixth embodiments).

The impact resistant resin constituting the reinforcing part 23 contains a polyolefin resin, a polyamide resin, and a compatibilizer. Further, the compatibilizer is a modified elastomer having a reactive group that reacts with the polyamide resin.

<1> Polyolefin Resin

The polyolefin resin constituting the impact resistant resin may be an olefin homopolymer and/or an olefin copolymer.

The olefin is not particularly limited, and examples thereof include ethylene, propylene, and an α-olefin having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin (another olefin does not include ethylene). Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin (another olefin does not include propylene). Examples of the latter include a propylene-ethylene copolymer and a propylene-1-butene copolymer (the content of a propylene-derived structural unit is 50% or more of the total structural units).

The copolymer of propylene and another olefin may be a random copolymer or a block copolymer, but is preferably a block copolymer. Particularly, a propylene-ethylene block copolymer having ethylene as another olefin is preferred. Such a propylene-ethylene block copolymer is also called, for example, an impact copolymer, a polypropylene impact copolymer, a heterophasic polypropylene, or a heterophasic block polypropylene.

The weight-average molecular weight (based on polystyrene standards) of the polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the polyolefin resin is a polyolefin that has no affinity for the polyamide resin that will be described later, and that has no reactive group capable of reacting with the polyamide resin, either. In this point, the polyolefin resin is different from an olefin-based component as the modified elastomer that will be describe later.

<2> Polyamide Resin

The polyamide resin constituting the impact resistant resin is a polymer obtained by polymerizing a plurality of monomers via amide bonds (—NH—CO—).

Examples of a monomer constituting the polyamide resin include amino acids such as 6-aminocaproic acid, 11-aminoundecanoic acid, 12-aminododecanoic acid, and para-aminomethyl benzoic acid, and lactams such as ε-caprolactam, undecane lactam, and ω-lauryl lactam. These monomers may be used singly or in combination of two or more of them.

The polyamide resin can be obtained also by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis-(4-aminocyclohexyl)methane; and aromatic diamines such as xylylene diamines (e.g., p-phenylenediamine and m-phenylenediamine). These diamines may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These dicarboxylic acids may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the impact resistant resin used in the present invention, among the above-mentioned various polyamide resins, one may be used which has a structure in which a hydrocarbon group between adjacent amide bonds in a main chain has a linear chain of 6 or more carbon atoms (usually 16 or less carbon atoms) (in the present invention, simply referred to as a "long chain structure"). When a polyamide resin having a long chain structure is used, the content of the long chain structure is preferably 50% or more and may be 100% of all the structural units of the polyamide resin. Specific examples of the polyamide resin having a long chain structure include polyamide 11, polyamide 610, polyamide 612, polyamide 614, polyamide 12, polyamide 6T, polyamide 6I, polyamide 9T, polyamide 1010, polyamide 1012, polyamide 10T, and polyamide 9T/2M-8T. These polyamides may be used singly or in combination of two or more of them.

In the present invention, among the above-mentioned various polyamide resins, one derived from a plant may be used. A plant-derived polyamide resin is desirable from the viewpoint of environmental protection (particularly from the viewpoint of carbon neutral) because it uses a monomer derived from a plant-derived component such as a vegetable oil.

Examples of the plant-derived polyamide resin include polyamide 11 (hereinafter, also simply referred to as "PA11"), polyamide 610 (hereinafter, also simply referred to as "PA610"), polyamide 612 (hereinafter, also simply referred to as "PA612"), polyamide 614 (hereinafter, also simply referred to as "PA614"), polyamide 1010 (hereinafter, also simply referred to as "PA1010"), polyamide 1012 (hereinafter, also simply referred to as "PA1012"), and polyamide 10T (hereinafter, also simply referred to as "PA10T"). These plant-derived polyamide resins may be used singly or in combination of two or more of them.

The weight-average molecular weight (based on polystyrene standards) of the polyamide resin measured by gel permeation chromatography (GPC) is not particularly limited, and may be, for example, 5,000 or more but 100,000 or less, but is preferably 7,500 or more but 50,000 or less, more preferably 10,000 or more but 50,000 or less.

<3> Modified Elastomer

The modified elastomer constituting the impact resistant resin is an elastomer having a reactive group that reacts with the polyamide resin. This modified elastomer is preferably a component having an affinity for the polyolefin resin. That is, the modified elastomer is preferably a component having compatibilizing action on the polyamide resin and the polyolefin resin. In other words, the modified elastomer is preferably a compatibilizer for the polyamide resin and the polyolefin resin.

Examples of the reactive group include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These reactive groups may be used singly or in combination of two or more of them.

The amount of modification of the modified elastomer is not limited as long as the modified elastomer has one or more reactive groups per molecule. Further, the modified elastomer preferably has 1 or more but 50 or less reactive groups, more preferably 3 or more but 30 or less reactive groups, particularly preferably 5 or more but 20 or less reactive groups per molecule.

Examples of the modified elastomer include: a polymer using any monomer capable of introducing a reactive group (a modified elastomer obtained by polymerization using monomers capable of introducing a reactive group); an oxidative degradation product of any polymer (a modified elastomer having a reactive group formed by oxidative degradation); and a graft polymer obtained by graft polymerization of an organic acid on any polymer (a modified elastomer having a reactive group introduced by graft polymerization of an organic acid). These modified elastomers may be used singly or in combination of two or more of them. These modified elastomers may be used singly or in combination of two or more of them.

Examples of the monomer capable of introducing a reactive group include a monomer having a polymerizable unsaturated bond and an acid anhydride group, a monomer having a polymerizable unsaturated bond and a carboxyl group, and a monomer having a polymerizable unsaturated bond and an epoxy group.

Specific examples of the monomer capable of introducing a reactive group include: acid anhydrides such as maleic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, and methacrylic acid. These compounds may be used singly or in combination of two or more of them. Among these compounds, acid anhydrides are preferred, maleic anhydride and itaconic anhydride are more preferred, and maleic anhydride is particularly preferred.

The type of a resin constituting the skeleton of the modified elastomer (hereinafter, referred to as "skeletal resin") is not particularly limited, and various thermoplastic resins may be used. As the skeletal resin, one or two or more of the various reins mentioned above as examples of the polyolefin resin may be used. Other examples of the skeletal resin include an olefin-based thermoplastic elastomer and a styrene-based thermoplastic elastomer. These skeletal resins may be used singly or in combination of two or more of them.

The olefin-based thermoplastic elastomer may be a copolymer of two or more olefins.

The olefins may be one or two or more of the various olefins mentioned above as examples of an olefin constituting the polyolefin resin. The olefin-based thermoplastic elastomer is particularly preferably a copolymer of ethylene and an α-olefin having 3 to 8 carbon atoms or a copolymer of propylene and an α-olefin having 4 to 8 carbon atoms.

Specific examples of the copolymer of ethylene and an α-olefin having 3 to 8 carbon atoms include an ethylene-propylene copolymer (EPR), an ethylene-1-butene copolymer (EBR), an ethylene-1-pentene copolymer, and an ethylene-1-octene copolymer (EOR).

Examples of the copolymer of propylene and an α-olefin having 4 to 8 carbon atoms include a propylene-1-butene copolymer (PBR), a propylene-1-pentene copolymer, and a propylene-1-octene copolymer (POR). These olefin-based thermoplastic elastomers may be used singly or in combination of two or more of them.

On the other hand, examples of the styrene-based thermoplastic elastomer include a block copolymer of a styrene-based compound and a conjugated diene compound and a hydrogenated product thereof.

Examples of the styrene-based compound include styrene, alkyl styrenes such as α-methyl styrene, p-methyl styrene, and p-t-butyl styrene, p-methoxy styrene, and vinyl naphthalene. These styrene-based compounds may be used singly or in combination of two or more of them.

Examples of the conjugated diene compound include butadiene, isoprene, piperylene, methyl pentadiene, phenyl butadiene, 3,4-dimethyl-1,3-hexadiene, and 4,5-diethyl-1,3-octadiene. These conjugated diene compounds may be used singly or in combination of two or more of them.

Specific examples of the styrene-based thermoplastic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS). These styrene-based thermoplastic elastomers may be used singly or in combination of two or more of them. Among them, SEBS is preferred.

The weight-average molecular weight (based on polystyrene standards) of the modified elastomer measured by gel permeation chromatography (GPC) is not particularly limited, and may be, for example, 10,000 or more but 500,000 or less, but is preferably 35,000 or more but 500,000 or less, more preferably 35,000 or more but 300,000 or less.

<4> Other Components

The impact resistant resin may contain other components in addition to the polyolefin resin, the polyamide resin, and the modified elastomer. Examples of the other components include a filler (reinforcing filler), a nucleating agent, an antioxidant, a thermal stabilizer, a weatherproofer, a light stabilizer, a plasticizer, an ultraviolet absorber, an antistatic agent, a flame retardant, a flame retardant aid, a slip agent, an antiblocking agent, an antifog agent, a lubricant, an antimicrobial agent, a colorant (pigment, dye), a disperser, a copper inhibitor, a neutralizer, an anti-foam agent, a weld strength improver, a natural oil, a synthetic oil, and a wax. These other components may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These other thermoplastic resins may be used singly or in combination of two or more of them.

Examples of the filler include: glass components (e.g., glass fibers, glass beads, and glass flakes); silica; inorganic fibers (glass fibers, alumina fibers, and carbon fibers), graphite, silicate compounds (e.g., calcium silicate, aluminum silicate, montmorillonite, kaolin, talc, and clay), metal oxides (e.g., iron oxide, titanium oxide, zinc oxide, antimony oxide, and alumina), carbonates and sulfates of metals such as lithium, calcium, magnesium, and zinc, metals (e.g., aluminum, iron, silver, and copper), hydroxides (e.g., aluminum hydroxide and magnesium hydroxide), sulfides (e.g., barium sulfate), carbides (e.g., wood charcoal and bamboo charcoal), titanides (e.g., potassium titanate and barium titanate), organic fibers (e.g., aromatic polyester fibers, aromatic polyamide fibers, fluororesin fibers, polyimide fibers, and vegetable fibers), and celluloses (e.g., cellulose microfibrils and cellulose acetate). These fillers may be used singly or in combination of two or more of them. They can be used also as nucleating agents.

<5> Phase Structure

The phase structure of the impact resistant resin is not limited, but the impact resistant resin can have the following phase structure (1), (2), or (3).

Phase structure (1): A phase structure having a continuous phase (A) containing a polyolefin resin and a dispersed phase (B) dispersed in the continuous phase (A) and containing a polyamide resin and a modified elastomer (see FIG. 10). It is to be noted that the phase structure (1) does not coexist with another phase structure having a continuous phase containing a polyamide resin and a dispersed phase dispersed in the continuous phase.

Phase structure (2): A phase structure having a continuous phase containing a polyamide resin and a dispersed phase dispersed in the continuous phase and containing a polyolefin resin It is to be noted that the phase structure (2) does not coexist with another phase structure having a continuous phase containing a polyolefin resin and a dispersed phase dispersed in the continuous phase.

Figure 11:
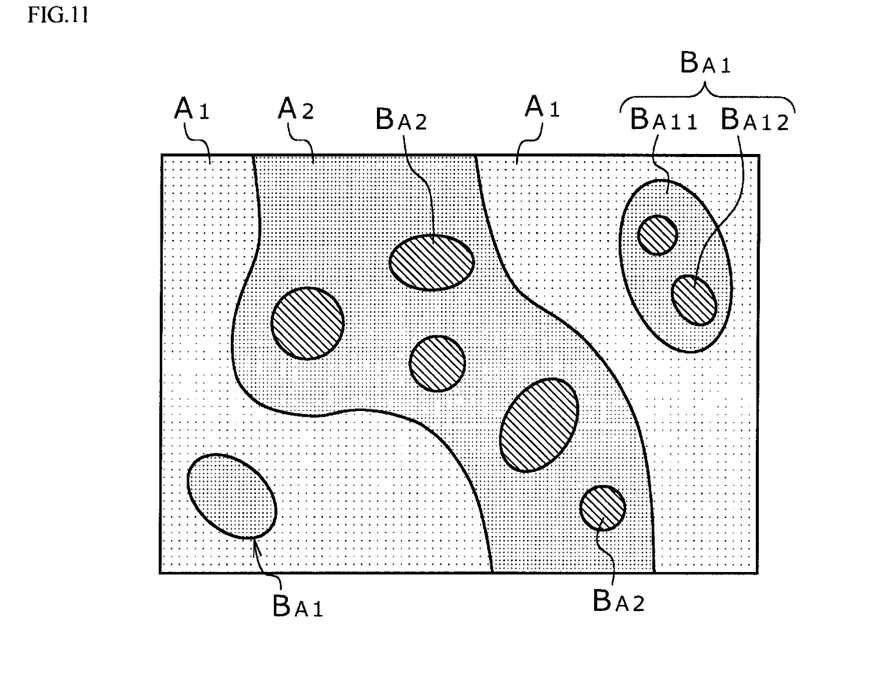
FIG. 11 is a drawing that illustrates a phase structure (3) of the impact resistant resin constituting the reinforcing part.

Phase Structure (3): A phase structure having a continuous phase ($A_1$) containing a polyolefin resin, a dispersed phase ($B_{A1}$) dispersed in the continuous phase ($A_1$) and containing a polyamide resin and a modified elastomer, a continuous phase ($A_2$) containing a polyamide resin, and a dispersed phase ($B_{A2}$) dispersed in the continuous phase ($A_2$) and containing a modified elastomer (see FIG. 11).

Among these phase structures, the phase structure (1) or the phase structure (3) is preferred, and the phase structure (1) is more preferred.

Figure 10:
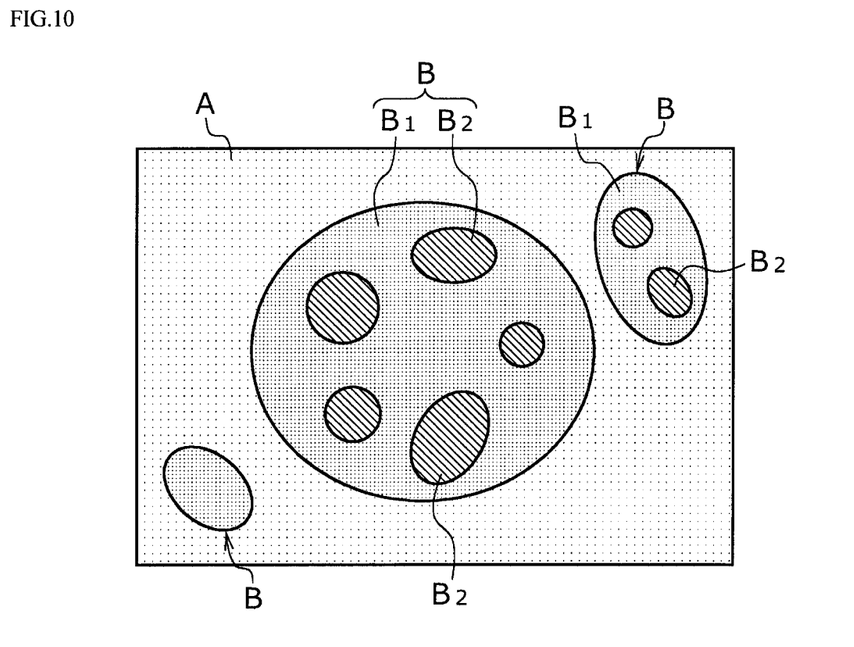
FIG. 10 is a drawing that illustrates a phase structure (1) of an impact resistant resin constituting the reinforcing part.

In the phase structure (1), the dispersed phase (B) in the phase structure (1) may further have a continuous phase ($B_1$) that is present in the dispersed phase (B) and contains the polyamide resin and a fine dispersed phase ($B_2$) that is dispersed in the continuous phase ($B_1$) and contains the modified elastomer (see FIG. 10). In this case, the phase structure (1) has a multiple phase structure having a fine dispersed phase ($B_1$) further dispersed in the dispersed phase (B).

It is to be noted that the modified elastomer present in the phase structure (1) may be an unreacted modified elastomer, a product obtained by reaction with the polyamide resin, or a mixture of them.

The phase structure (3) can be a co-continuous phase structure in which two continuous phases, the continuous phase ($A_1$) and the continuous phase ($A_2$), coexist. The dispersed phase ($B_{A1}$) present in the continuous phase ($A_1$) may have a continuous phase ($B_{A11}$) that is present in the dispersed phase ($B_{A1}$) and contains the polyamide resin and a fine dispersed phase ($B_{A12}$) that is dispersed in the continuous phase ($B_{A11}$) and contains the modified elastomer. In this case, the phase structure (3) has a multiple phase structure having a fine dispersed phase ($B_{A12}$) further dispersed in the dispersed phase ($B_{A1}$).

It is to be noted that the modified elastomer present in the phase structure (3) may be an unreacted modified elastomer, a product obtained by reaction with the polyamide resin, or a mixture of them.

In the case of the phase structure (1), the continuous phase (A) contains a polyolefin resin. The polyolefin resin is a main component of the continuous phase (A) (the ratio of the polyolefin resin is usually 70% by mass or more and may be 100% by mass with respect to the total mass of the continuous phase A). The dispersed phase (B) contains a polyamide resin and a modified elastomer. The polyamide resin (when the dispersed phase (B) contains a modified elastomer, the polyamide resin and the modified elastomer) is (are) a main component of the dispersed phase (B) (the ratio of the polyamide resin (the polyamide resin and the modified elastomer) is usually 70% by mass or more and may be 100% by mass with respect to the total mass of the dispersed phase B).

When the phase structure (1) has the above-described multiple phase structure, the continuous phase ($B_1$) contains the polyamide resin. The polyamide resin is a main component of the continuous phase ($B_1$) (the ratio of the polyamide resin is usually 70% by mass or more and may be 100% by mass with respect to the total mass of the continuous phase $B_1$). The fine dispersed phase ($B_2$) contains the modified elastomer. The modified elastomer is a main component of the fine dispersed phase ($B_2$) (the ratio of the modified elastomer is usually 70% by mass or more and may be 100% by mass with respect to the total mass of the fine dispersed phase $B_2$).

In the case of the phase structure (3), the continuous phase ($A_1$) contains a polyolefin resin. The polyolefin resin is a main component of the continuous phase ($A_1$) (the ratio of the polyolefin resin is usually 70% by mass or more and may be 100% by mass with respect to the total mass of the continuous phase $A_1$). Further, the dispersed phase ($B_{A1}$) contains a polyamide resin and a modified elastomer. The polyamide resin and the modified elastomer are a main component of the dispersed phase ($B_{A1}$) (the ratio of the polyamide resin and the modified elastomer is usually 70% by mass or more and may be 100% by mass with respect to the total mass of the dispersed phase $B_2$).

When the phase structure (3) is the above-described multiple phase structure, the continuous phase ($B_{A11}$) contains the polyamide resin. The polyamide resin is a main component of the continuous phase ($B_{11}$) (the ratio of the polyamide resin is usually 70% by mass or more and may be 100% by mass with respect to the total mass of the continuous phase $B_{A11}$). The fine dispersed phase ($B_{A12}$) contains the modified elastomer. The modified elastomer is a main component of the fine dispersed phase ($B_{A12}$) (the ratio of the modified elastomer is usually 70% by mass or more and may be 100% by mass with respect to the total mass of the fine dispersed phase $B_{A12}$).

The continuous phase ($A_2$) contains the polyamide resin. The polyamide resin is a main component of the continuous phase ($A_2$) (the ratio of the polyamide resin is usually 70% by mass or more and may be 100% by mass with respect to the total mass of the continuous phase $A_2$). The dispersed phase ($B_{A2}$) dispersed in the continuous phase ($A_2$) contains the modified elastomer. The modified elastomer is a main component of the dispersed phase ($B_{A2}$) (the ratio of the modified elastomer is usually 70% by mass or more and may be 100% by mass with respect to the total mass of the dispersed phase $B_{A2}$).

These phase structures can more reliably be obtained by melt-kneading a polyolefin resin and a melt-kneaded product of a polyamide resin and a modified elastomer.

It is to be noted that the impact resistant resin may contain a reaction product obtained by the reaction of the reactive group of the modified elastomer with the polyamide resin. In this case, in the phase structure (1), the reaction product can be present at, for example, the interface between the continuous phase (A) and the dispersed phase (B) and/or the interface between the continuous phase ($B_1$) and the fine dispersed phase ($B_2$). Similarly, in the phase structure (3), the reaction product can be present at, for example, the interface between the continuous phase ($A_1$) and the continuous phase ($A_2$), the interface between the continuous phase ($A_1$) and the dispersed phase ($B_{A1}$), and the interface between the continuous phase ($B_{A11}$) and the fine dispersed phase ($B_{A12}$).

The various phase structures can be observed by observing the treated surface of a test specimen subjected to oxygen plasma etching and then to osmium coating with a field-emission scanning electron microscope (FE-SEM). Particularly, the dispersed phase and the fine dispersed phase can be observed in an image enlarged 1000 times or more (usually 10,000 times or less) by this method. The component constituting each of the phases can be identified by performing energy dispersive X ray spectrometry (EDS) during the observation using the field-emission scanning electron microscope (FE-SEM).

The size of the dispersed phase (the dispersed phase B shown in FIG. 10, the dispersed phase $B_{A1}$ shown in FIG. 11) of the impact resistant resin is not particularly limited, but the dispersion diameter (average dispersion diameter) of the dispersed phase is preferably 10000 nm or less, more preferably 50 nm or more but 8000 nm or less, even more preferably 100 nm or more but 4000 nm or less.

The dispersion diameter of the dispersed phase can be measured in an electron microscope image enlarged 1000 times or more. More specifically, 20 particles of the dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the dispersed phase.

The size of the fine dispersed phase (the fine dispersed phase $B_2$ shown in FIG. 10, the fine dispersed phase $B_{A12}$ shown in FIG. 11) contained in the dispersed phase (the dispersed phase B shown in FIG. 10, the dispersed phase $B_{A1}$ shown in FIG. 11) of the impact resistant resin is not particularly limited, but the dispersion diameter (average dispersion diameter) of the fine dispersed phase is preferably 5 nm or more but 1000 nm or less, more preferably 5 nm or more but 600 nm or less, even more preferably 10 nm or more but 400 nm or less, particularly preferably 15 nm or more but 350 nm or less.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the fine dispersed phase.

<6> Blending

When the total of the polyolefin resin, the polyamide resin, and the modified elastomer contained in the impact resistant resin is taken as 100% by mass, the ratio of the polyolefin resin may be 2% by mass or more but 90% by mass or less. The ratio of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less.

When the total of the polyolefin resin, the polyamide resin, and the modified elastomer contained in the impact resistant resin is taken as 100% by mass, the ratio of the polyamide resin and the modified elastomer (part or all of them may be reacted with each other) may be 10% by mass or more but 98% by mass or less. The ratio of the polyamide resin and the modified elastomer is preferably 15% by mass or more but 95% by mass or less, more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less.

When the total of the polyolefin resin, the polyamide resin, and the modified elastomer contained in the impact resistant resin is taken as 100% by mass, the ratio of the polyamide resin may be 1% by mass or more but 75% by mass or less. The ratio of the polyamide resin is preferably 2% by mass or more but 70% by mass or less, more preferably 4% by mass or more but 65% by mass or less, even more preferably 6% by mass or more but 60% by mass or less, even more preferably 8% by mass or more but 55% by mass or less, even more preferably 10% by mass or more but 50% by mass or less, even more preferably 12% by mass or more but 45% by mass or less, even more preferably 15% by mass or more but 40% by mass or less.

When the total of the polyolefin resin, the polyamide resin, and the modified elastomer contained in the impact resistant resin is taken as 100% by mass, the ratio of the modified elastomer may be 1% by mass or more but 60% by mass or less. The ratio of the modified elastomer is preferably 2% by mass or more but 55% by mass or less, more preferably 4% by mass or more but 45% by mass or less, even more preferably 6% by mass or more but 40% by mass or less, even more preferably 8% by mass or more but 38% by mass or less, even more preferably 10% by mass or more but 37% by mass or less, even more preferably 12% by mass or more but 36% by mass or less, even more preferably 15% by mass or more but 35% by mass or less.

When the total of the polyolefin resin and the polyamide resin contained in the impact resistant resin is taken as 100% by mass, the ratio of the polyamide resin may be 1.5% by mass or more but 88% by mass or less. The ratio of the polyamide resin is preferably 3% by mass or more but 75% by mass or less, more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less.

When the total of the polyamide resin and the modified elastomer contained in the impact resistant resin is taken as 100% by mass, the ratio of the modified elastomer may be 20% by mass or more but 90% by mass or less. The ratio of the modified elastomer is preferably 22% by mass or more but 88% by mass or less, more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less.

It is to be noted that in the case of the phase structure (1) (see FIG. 10), the ratio of the polyolefin resin when the total of the polyolefin resin, the polyamide resin, and the modified elastomer is taken as 100% by mass is usually equal to the ratio of the continuous phase (A) when the total mass of the phases of the phase structure (1) is taken as 100% by mass. On the other hand, in the case of the phase structure (3) (see FIG. 11), the ratio of the polyolefin resin when the total of the polyolefin resin, the polyamide resin, and the modified elastomer is taken as 100% by mass is usually equal to the ratio of the continuous phase ($A_1$) when the total mass of the phases of the phase structure (3) is taken as 100% by mass. The ratio mentioned herein refers to a volume ratio, and is usually also equal to an area ratio reflecting the volume ratio (the same applies hereinafter).

In the case of the phase structure (1) (see FIG. 10), the ratio of the polyamide resin and the modified elastomer when the total of the polyolefin resin, the polyamide resin, and the modified elastomer is taken as 100% by mass is usually equal to the ratio of the dispersed phase (B) when the total mass of the phases of the phase structure (1) is taken as 100% by mass. On the other hand, in the case of the phase structure (3) (see FIG. 11), the ratio of the polyamide resin and the modified elastomer when the total of the polyolefin resin, the polyamide resin, and the modified elastomer is taken as 100% by mass is usually equal to the total ratio of the dispersed phase ($B_{A1}$), the continuous phase ($A_2$), and the dispersed phase ($B_AD$) when the total mass of the phases of the phase structure (3) is taken as 100% by mass.

In the case of the phase structure (1) (see FIG. 10), the ratio of the polyamide resin when the total of the polyolefin resin, the polyamide resin, and the modified elastomer is taken as 100% by mass is usually equal to the ratio of the continuous phase ($B_1$) when the total mass of the phases of the phase structure (1) is taken as 100% by mass. On the other hand, in the case of the phase structure (3) (see FIG. 11), the ratio of the polyamide resin when the total of the polyolefin resin, the polyamide resin, and the modified elastomer is taken as 100% by mass is usually equal to the total ratio of the continuous phase ($A_2$) and the continuous phase ($B_{A11}$) present in the dispersed phase when the total mass of the phases of the phase structure (3) is taken as 100% by mass.

In the case of the phase structure (1) (see FIG. 10), the ratio of the modified elastomer when the total of the polyolefin resin, the polyamide resin, and the modified elastomer is taken as 100% by mass is usually equal to the ratio of the fine dispersed phase ($B_2$) when the total mass of the phases of the phase structure (1) is taken as 100% by mass. On the other hand, in the case of the phase structure (3) (see FIG. 11), the ratio of the modified elastomer when the total of the polyolefin resin, the polyamide resin, and the modified elastomer is taken as 100% by mass is usually equal to the total ratio of the fine dispersed phase ($B_{A12}$) and the dispersed phase ($B_{A2}$) when the total mass of the phases of the phase structure (3) is taken as 100% by mass.

<7> Physical Properties

This impact resistant resin can achieve high impact resistance, high flexural modulus, or both of these properties. For example, the impact resistant resin can achieve a Charpy impact strength of 5 kJ/m$^2$ or more but 150 kJ/m$^2$ or less. The impact resistant resin can achieve a flexural modulus of 430 MPa or more but 1500 MPa or less. Further, the impact resistant resin can achieve a Charpy impact strength of 50 kJ/m$^2$ or more but 140 kJ/m$^2$ or less. The impact resistant resin can achieve a flexural modulus of 440 MPa or more but 1300 MPa or less. Further, the impact resistant resin can achieve a Charpy impact strength of 60 kJ/m$^2$ or more but 135 kJ/m$^2$ or less. The impact resistant resin can achieve a flexural modulus of 450 MPa or more but 1250 MPa or less. Further, the impact resistant resin can achieve a Charpy impact strength of 70 kJ/m$^2$ or more but 130 kJ/m$^2$ or less. The impact resistant resin can achieve a flexural modulus of 460 MPa or more but 1200 MPa or less. Further, the impact resistant resin can achieve a Charpy impact strength of 80 kJ/m$^2$ or more but 125 kJ/m$^2$ or less. The impact resistant resin can achieve a flexural modulus of 470 MPa or more but 1100 MPa or less.

It is to be noted that the values of the Charpy impact strength are measured in accordance with JIS K 7111-1 (type A notch, temperature: 23° C., edgewise test method). The values of the flexural modulus are measured in accordance with JIS K7171 (distance between supporting points: 64 mm, support at two supporting points with a curvature radius of 5 mm, a point of action with a curvature radius of 5 mm is used, load application rate: 2 mm/min).

A method for preparing the impact resistant resin is not limited, but the impact resistant resin can be obtained by, for example, melt-kneading a polyolefin resin and a melt-kneaded product of a polyamide resin and a modified elastomer. The preparation of the melt-kneaded product and the melt-kneading of the melt-kneaded product and a polyolefin resin may be performed using any melt-kneading device. Examples of the melt-kneading device include an extruder (e.g., a single-screw extruder or a twin-screw melt-kneading extruder), a kneader, and a mixer (e.g., a high-speed flow mixer, a paddle mixer, or a ribbon mixer).

The melt-kneading temperature of a polyamide resin and a modified elastomer is not limited, and may be, for example, 190° C. or higher but 350° C. or lower, but is preferably 200° C. or higher but 330° C. or lower, more preferably 205° C. or higher but 310° C. or lower. The melt-kneading temperature of the obtained melt-kneaded product and a polyolefin resin is not limited, and may be, for example, 190° C. or higher but 350° C. or lower, but is preferably 200° C. or higher but 300° C. or lower, more preferably 205° C. or higher but 260° C. or lower.

The reinforcing part and/or the other reinforcing part may be a solid part, but if necessary, part or entirety thereof may be foamed. That is, the reinforcing part may be formed by foam molding. Further, the other reinforcing part may be formed by foam molding (hereinafter, the reinforcing part and the other reinforcing part formed by foam molding are simply referred to also as "foamed parts"). When the reinforcing part and the other reinforcing part are formed by foam molding, the vehicle door trim board can have a light weight and excellent heat insulating properties while having excellent impact resistance.

The foamed part can be obtained by foaming the impact resistant resin. When the impact resistant resin has such a phase structure including a continuous phase (A) and a dispersed phase (B) as described above, it is preferred that air bubbles be contained in the continuous phase (A) but not contained in the dispersed phase (B).

[2] Door Trim

A trim board (10) according to the present invention (see FIG. 1) includes the above-described vehicle door trim board (20) and a surface skin layer (15) provided on a design surface side of the vehicle door trim board (20). That is, the surface skin layer (15) can be provided to constitute a design surface (10a) of the door trim (10).

Figure 1:
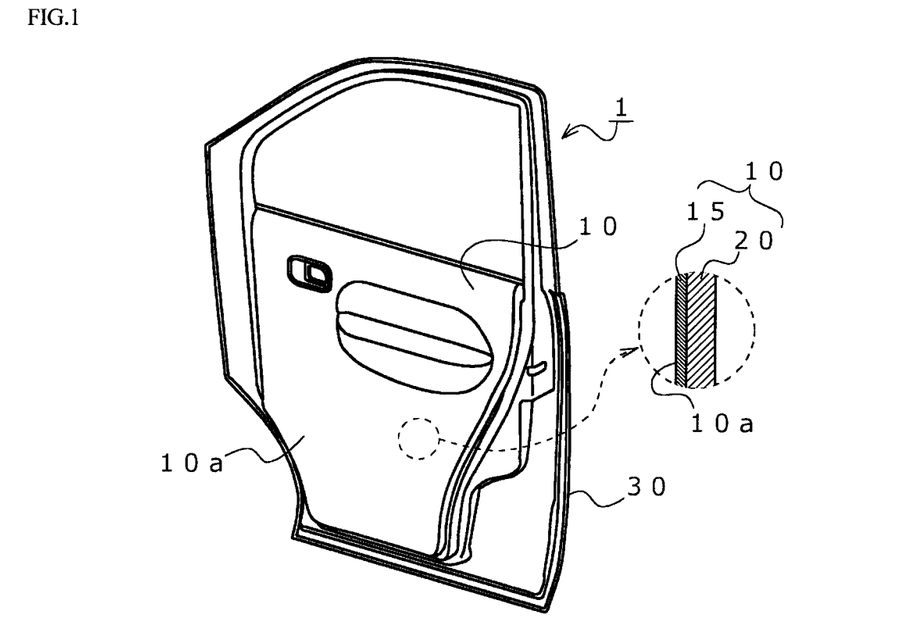
FIG. 1 is a perspective view that illustrates a vehicle door and a door trim.

This door trim (10) is fitted to a door panel (30), and the door trim (10) and the door panel (30) function as a vehicle door (1) as a whole.

The surface skin layer 15 is a layer forming a design surface of the door trim 10. More specifically, the surface skin layer 15 may be any of various cloths (including woven cloths, knitted cloths, nonwoven cloths, etc.) or a resin skin (e.g., a resin skin material patterned by embossing). The structure of the surface skin layer 15 is not limited, and the surface skin layer 15 may have one layer or two or more layers. When having two or more layers, the surface skin layer 15 may be a laminated body including, for example, a surface layer (e.g., artificial leather or woven fabric) having a design surface and a cushion layer (provided on the non-design surface side of the surface skin layer 15).

As described above, the door trim 10 according to the present invention includes the surface skin layer 28. However, the door trim 10 can of course be used even without the surface skin layer 28. That is, the vehicle door trim board 20 can directly be used as the door trim 10 when the design surface of the vehicle door trim board 20 is patterned by, for example, being directly subjected to embossing.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein; rather, the present invention extends to all the functionally-equivalent structures, methods, and uses within the scope of the appended claims.

INDUSTRIAL APPLICABILITY

The vehicle door trim board and the door trim according to the present invention are used as interior materials for automobiles and railway vehicles. They can be used also as other interior materials for automobiles. Specific examples thereof include instrument panels, door trims, quarter trims, roof linings, pillar garnishes, deck trims, tonneau boards, package trays, dashboards, console boxes, and seat backboards.

REFERENCE SIGNS LIST

1 Vehicle door
10 Door trim, 10a; Design surface
15 Surface skin layer
20 Vehicle door trim board, 20a; Design surface, 20b; Non-design surface
21 Upper board part
23 Reinforcing part
24, 241, 242 Other reinforcing parts
25 Lower board part
27 Armrest board part
30 Door panel
A Continuous phase
B Dispersed phase
$B_1$ Continuous phase (Continuous phase in dispersed phase B)
$B_2$ Fine dispersed phase (Dispersed phase in dispersed phase B)
$A_1, A_2$ Continuous phase
$B_{A1}, B_{A2}$ Dispersed phase
$B_{A11}$ Continuous phase (Continuous phase in dispersed phase $B_{A1}$)
$B_{A12}$ Fine dispersed phase (Dispersed phase in dispersed phase $B_{A1}$)

The invention claimed is:

1. A vehicle door trim board comprising:
an upper board part and a lower board part which are separated in a vertical direction; and
a first reinforcing part made of an impact resistant resin containing a polyolefin resin, a polyamide resin, and a compatibilizer, wherein the compatibilizer is a modified elastomer having a reactive group that reacts with the polyamide resin;
wherein the first reinforcing part is interposed between the upper board part and the lower board part, and the first reinforcing part is provided so as to penetrate the vehicle door trim board in a longitudinal direction of the first reinforcing part,
wherein the lower board part has at least one second band-shaped reinforcing part embedded in the lower board part, the second band-shaped reinforcing part being different from the first reinforcing part,
wherein the second reinforcing part is made of the impact resistant resin and provided almost in parallel to the reinforcing part, and
wherein the first reinforcing part and the at least one second band-shaped reinforcing parts each have a cross-section orthogonal to their longitudinal direction, wherein the cross-sections each having essentially constant width and thickness along their longitudinal dimension.

2. The vehicle door trim board according to claim 1, wherein each of the upper board part and the lower board part is formed of a foamed resin board using another thermoplastic resin different from the impact resistant resin, and wherein
the upper board part, the lower board part, and the first reinforcing part are integrally provided as a multi-material molded body using the another thermoplastic resin and the impact resistant resin.

3. The vehicle door trim board according to claim 1, wherein each of the upper board part and the lower board part is formed of a fiber-reinforced board containing plant fibers and a binder resin that binds the plant fibers together, and wherein
the upper board part, the lower board part, and the first reinforcing part are integrally provided as an insert-molded product using the fiber-reinforced boards as insert bodies.

4. The vehicle door trim board according to claim 1, wherein the impact resistant resin has
a continuous phase (A) containing the polyolefin resin, and
a dispersed phase (B) dispersed in the continuous phase (A) and containing the polyamide resin and the modified elastomer.

5. The vehicle door trim board according to claim 4, wherein the dispersed phase (B) has a continuous phase ($B_1$) containing the polyamide resin, and
a fine dispersed phase ($B_2$) dispersed in the continuous phase ($B_1$) and containing the modified elastomer.

6. The vehicle door trim board according to claim 4, wherein the modified elastomer is an olefin-based thermoplastic elastomer having, as a skeleton, a copolymer of ethylene or propylene and an α-olefin having 3 to 8 carbon atoms.

7. A door trim comprising:
the vehicle door trim board according to claim 1; and
a surface skin layer provided on a design surface side of the vehicle door trim board.

* * * * *